(12) United States Patent
Zheng et al.

(10) Patent No.: US 12,313,814 B2
(45) Date of Patent: May 27, 2025

(54) ELECTROMAGNETIC DIELECTRIC MATERIAL AND METHOD FOR PRODUCING ELECTROMAGNETIC DIELECTRIC MATERIAL

(71) Applicant: FOSHAN EAHISON COMMUNICATION CO., LTD., Guangdong (CN)

(72) Inventors: Hongzhen Zheng, Guangdong (CN); Yongchao Lu, Guangdong (CN); Wei Li, Guangdong (CN); Chunhui Shang, Guangdong (CN); Yaozhi Sun, Guangdong (CN)

(73) Assignee: FOSHAN EAHISON COMMUNICATION CO., LTD., Guangdong (CN)

( * ) Notice: Subject to any disclaimer, the term of this patent is extended or adjusted under 35 U.S.C. 154(b) by 520 days.

(21) Appl. No.: 17/638,623

(22) PCT Filed: Nov. 11, 2019

(86) PCT No.: PCT/CN2019/116939
§ 371 (c)(1),
(2) Date: Feb. 25, 2022

(87) PCT Pub. No.: WO2021/047006
PCT Pub. Date: Mar. 18, 2021

(65) Prior Publication Data
US 2022/0342120 A1    Oct. 27, 2022

(30) Foreign Application Priority Data

Sep. 10, 2019 (CN) .......................... 201910845984.6

(51) Int. Cl.
*G02B 1/04* (2006.01)
*B29C 44/12* (2006.01)
(Continued)

(52) U.S. Cl.
CPC .......... *G02B 1/041* (2013.01); *B29C 44/1266* (2013.01); *B29C 44/507* (2016.11);
(Continued)

(58) Field of Classification Search
None
See application file for complete search history.

(56) References Cited

U.S. PATENT DOCUMENTS

2017/0279202 A1* 9/2017 Galla ................... H01Q 19/062
2018/0166789 A1    6/2018 Galla et al.

FOREIGN PATENT DOCUMENTS

CN         1759505 A     4/2006
CN       103296355 A     9/2013
(Continued)

OTHER PUBLICATIONS

Machine Translation of CN103474147 (Year: 2013).*
(Continued)

*Primary Examiner* — Shawn Mckinnon
(74) *Attorney, Agent, or Firm* — NORTON ROSE FULBRIGHT US LLP

(57) ABSTRACT

Provided is an electromagnetic dielectric material (1). The electromagnetic dielectric material (1) is a column structure. The electromagnetic dielectric material (1) includes an inner core (11), a first foam layer (12) and a second foam layer (13) sequentially arranged from inside to outside on the cross section of the column structure. The first foam layer (12) and the second foam layer (13) are each a layer formed from a foam material foamed. The electromagnetic dielectric material further includes metal wires (14). The metal wires (14) are disposed in the longitudinal direction of the column structure, are not in contact with each other and are evenly distributed on the periphery of the first foam layer
(Continued)

(12). Further provided is a method for producing an electromagnetic dielectric material (1).

10 Claims, 4 Drawing Sheets

(51) Int. Cl.
  *B29C 44/50*   (2006.01)
  *B29C 44/56*   (2006.01)
  *C08J 9/04*   (2006.01)
  *C08J 9/36*   (2006.01)
  *G02B 3/00*   (2006.01)

(52) U.S. Cl.
  CPC ............... *B29C 44/56* (2013.01); *C08J 9/04* (2013.01); *C08J 9/365* (2013.01); *B29K 2995/0006* (2013.01); *C08J 2201/03* (2013.01); *C08J 2323/06* (2013.01); *C08J 2423/06* (2013.01); *G02B 3/0087* (2013.01)

(56) References Cited

FOREIGN PATENT DOCUMENTS

| CN | 103474147 | * | 12/2013 |
|---|---|---|---|
| CN | 103474147 A | | 12/2013 |
| CN | 105470659 A | | 4/2016 |
| CN | 107959122 A | | 4/2018 |
| CN | 108432045 A | | 8/2018 |
| CN | 109659093 A | | 4/2019 |
| CN | 110098490 A | | 8/2019 |
| CN | 110112569 A | | 8/2019 |
| KR | 20090043198 | * | 5/2009 |
| WO | 2005/002841 A1 | | 1/2005 |
| WO | 2009/078807 A1 | | 6/2009 |

OTHER PUBLICATIONS

Machine Translation of KR20090043198 (Year: 2009).*
European Search Report issued on Jul. 27, 2023 in corresponding patent application No. 19945277.2-1102.
First Office Action issued in corresponding Chinese Patent Application No. 201910845984.6, with English translation.
Second Office Action issued in corresponding Chinese Patent Application No. 201910845984.6, with English translation.
Third Office Action issued in corresponding Chinese Patent Application No. 201910845984.6, with English translation.
Search Reports issued in corresponding Chinese Patent Application No. 201910845984.6.
International Search Report issued in PCT/CN2019/116939 on Apr. 16, 2020.

* cited by examiner

A-A

B-B

ELECTROMAGNETIC DIELECTRIC MATERIAL AND METHOD FOR PRODUCING ELECTROMAGNETIC DIELECTRIC MATERIAL

CROSS-REFERENCE TO RELATED APPLICATIONS

The present application is a United States national phase under 35 U.S.C. § 371 of International Patent Application No. PCT/CN2019/116939 filed Nov. 11, 2019, which claims the benefit of priority from Chinese Patent Application No. 201910845984.6 filed Sep. 10, 2019, each of which is expressly incorporated herein by reference in its entirety.

TECHNICAL FIELD

The present disclosure relates to the field of dielectric material manufacturing and, in particular, to a dielectric material that can be used in the manufacturing of a Luneburg lens and a method for producing the dielectric material.

BACKGROUND

A patent document entitled "AN ARTIFICIAL DIELECTRIC MATERIAL AND A METHOD OF MANUFACTURING THE SAME", with publication No. WO2009078807 and a publication date of Jun. 25, 2009, discloses an artificial dielectric material and a method for manufacturing the same. This dielectric material can be used in the manufacturing of a Luneburg lens. The solution of this disclosure is mainly to dispose long conductive fibers in parallel arrangement between an upper sheet of foam material and a lower sheet of foam material, adhere them into a sandwich structure sheet and then cut the sheet into particles. The obtained particles include short conductive fibers that are not in contact with each other. These particles are randomly mixed and adhered together by an adhesive to obtain a dielectric material with a controlled dielectric constant.

However, the product and the manufacturing method described in this disclosure are defective in practice as follows: since the size of particles is very small, usually only a few millimeters square, the cutting method configured to cut the sandwich structure sheet into particles is basically a longitudinally and latitudinally cutting method. Therefore, the cutting workload in a later stage is large, and the requirement of cutting precision is high. As a result, the production cost is increased eventually.

Thus, the structure and the manufacturing method of the existing dielectric material need to be improved.

SUMMARY

The present disclosure provides an electromagnetic dielectric material to solve the problems of low production efficiency and high production cost of the existing electromagnetic dielectric material.

The electromagnetic dielectric material, in particular, is a column structure. The electromagnetic dielectric material includes an inner core, a first foam layer and a second foam layer sequentially arranged from inside to outside on a cross section of the column structure. The electromagnetic dielectric material further includes metal wires. The metal wires are disposed in the longitudinal direction of the column structure, are not in contact with each other and are evenly distributed on the periphery of the first foam layer.

The first foam layer and the second foam layer are each a layer formed from a foam material foamed and are preferably made of expandable polyethylene (EPE) pearl cotton, an expandable polystyrene (EPS) material or an ethylene vinyl acetate (EVAN material. However, the material of the first foam layer may also be different from the material of the second foam layer.

The material of the inner core may be a non-metal material or a metal material.

The number of the metal wires is preferably 2 to 8. The diameter of one metal wire segment is preferably in a range from 0.01 mm to 0.5 mm.

The contour shape of the cross section of the first foam layer may be a circle or a regular polygon.

The contour shape of the cross section of the second foam layer may also be a circle or a regular polygon.

When the contour shape of the cross section of the first foam layer and the contour shape of the cross section of the second foam layer are circular, the diameter of the second foam layer is preferably 4 mm to 12 mm. The diameter of the first foam layer is 0.3 to 0.7 of the diameter of the second foam layer.

The electromagnetic dielectric material with such a structure has the advantages of simple structure, accurate control of the dielectric constant, light weight per unit volume, easy and efficient production, and stable technical indicators. The use of such materials in the production of a Luneburg lens can significantly reduce the production cost and the weight of the Luneburg lens and play a very positive role in the use and the promotion of the Luneburg lens in a communication antenna.

It is to be noted that the important indicator of the electromagnetic dielectric material is the dielectric constant. The foam material used for the first foam layer and the second foam layer should be a material in which the dielectric constant is as low as possible. The material and diameter of the inner core, as well as the number, material and diameters of the metal wires may be configured to improve the dielectric constant. Moreover, these materials and/or parameters may be artificially controlled. Therefore, these materials and/or parameters are artificially configured to make the dielectric constant of the produced electromagnetic dielectric material finally satisfy the target.

The present disclosure further provides a method for producing an electromagnetic dielectric material to produce a dielectric material with light weight per unit volume efficiently and low-costly. The solution described below is adopted.

The production method for producing an electromagnetic dielectric material includes the steps described below.

(1) A wire core is threaded into the extruder chamber of a first rod extruder and then out from the extruder outlet. While the first rod extruder is extruding a material, the wire core is pulled synchronously such that the material dads the wire core and such that the wire core is in the center of the material so that a wire core rod is obtained.

(2) The wire core rod is threaded into the extruder chamber of a second rod extruder and then out from the extruder outlet of the second rod extruder. At the same time, metal wires are threaded into the extruder chamber of the second rod extruder and then out from the extruder outlet of the second rod extruder. While the second rod extruder is extruding a material, the wire core rod and the metal wires are pulled synchronously such that the metal wires are not in contact with each other and are evenly distributed on the periphery of the wire core rod and such that the material extruded by the second rod extruder clads the wire core rod and each metal wire so that a double-layer rod is obtained.

(3) Subsequently, the double-layer rod is cut into a required length to obtain the electromagnetic dielectric material.

The first rod extruder and the second rod extruder are each a foam material rod extruder.

Through such a solution, a granular electromagnetic dielectric material with conductor wire segments inside can be simply and efficiently produced without longitudinally and latitudinally cutting. Since such an electromagnetic dielectric material is mainly a foamed structure, the weight per unit volume of the electromagnetic dielectric material is also very light. The material and diameter of the wire core, as well as the number, material and diameters of the metal wires are selected to control the average dielectric constant of the final dielectric material.

In this production method, the material used by the first rod extruder and the second rod extruder is preferably the EPE pearl cotton, the EPS material or the EVA material. However, the material used by the first rod extruder may also be different from the material used by the second rod extruder.

The contour shape of the cross section of the wire core rod may a circle or a regular polygon.

The contour shape of the cross section of the double-layer rod may also be a circle or a regular polygon.

Additionally, before the wire core rod is threaded into the extruder chamber of the second rod extruder, it is best to give time to fully expand and cool the wire core rod to stabilize the shape of the wire core rod.

In the present disclosure, the method for producing an electromagnetic dielectric material has the advantages of high production efficiency, low cost, light weight, and easy control of dielectric characteristics. The obtained dielectric material can be used in the manufacturing of the Luneburg lens.

REFERENCE LIST

Figure 1:
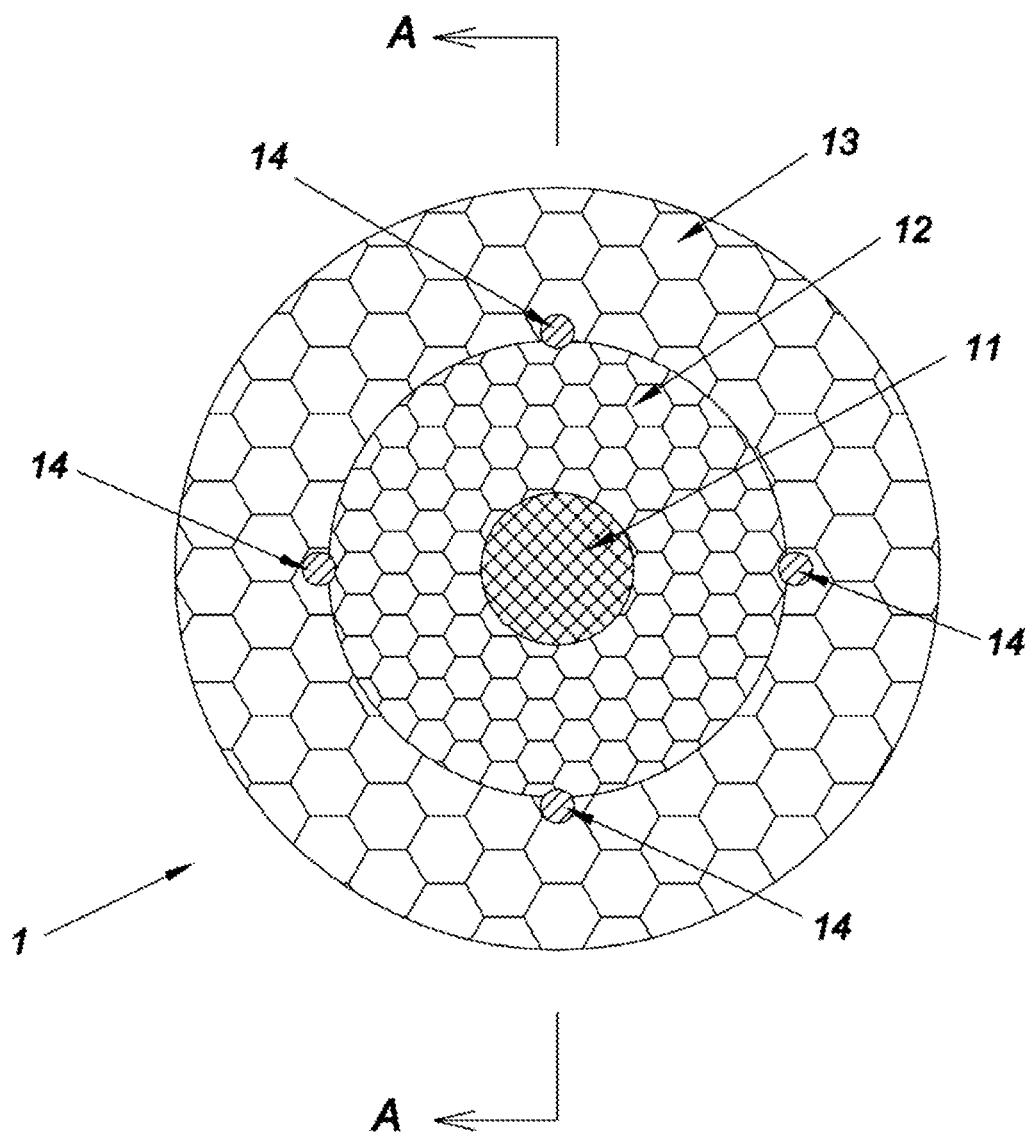
FIG. 1 is a front view illustrating the structure of an electromagnetic dielectric material according to embodiment one.

1 electromagnetic dielectric material
11 inner core
12 first foam layer
13 second foam layer
14 metal wire segment
2 electromagnetic dielectric material
21 inner core
22 first foam layer
23 second foam layer
24 metal wire segment

DETAILED DESCRIPTION

The content of the present disclosure is further described hereinafter in conjunction with embodiments.

Embodiment One

This embodiment is an illustrative example of an electromagnetic dielectric material structure of the present disclosure.

Figure 2:
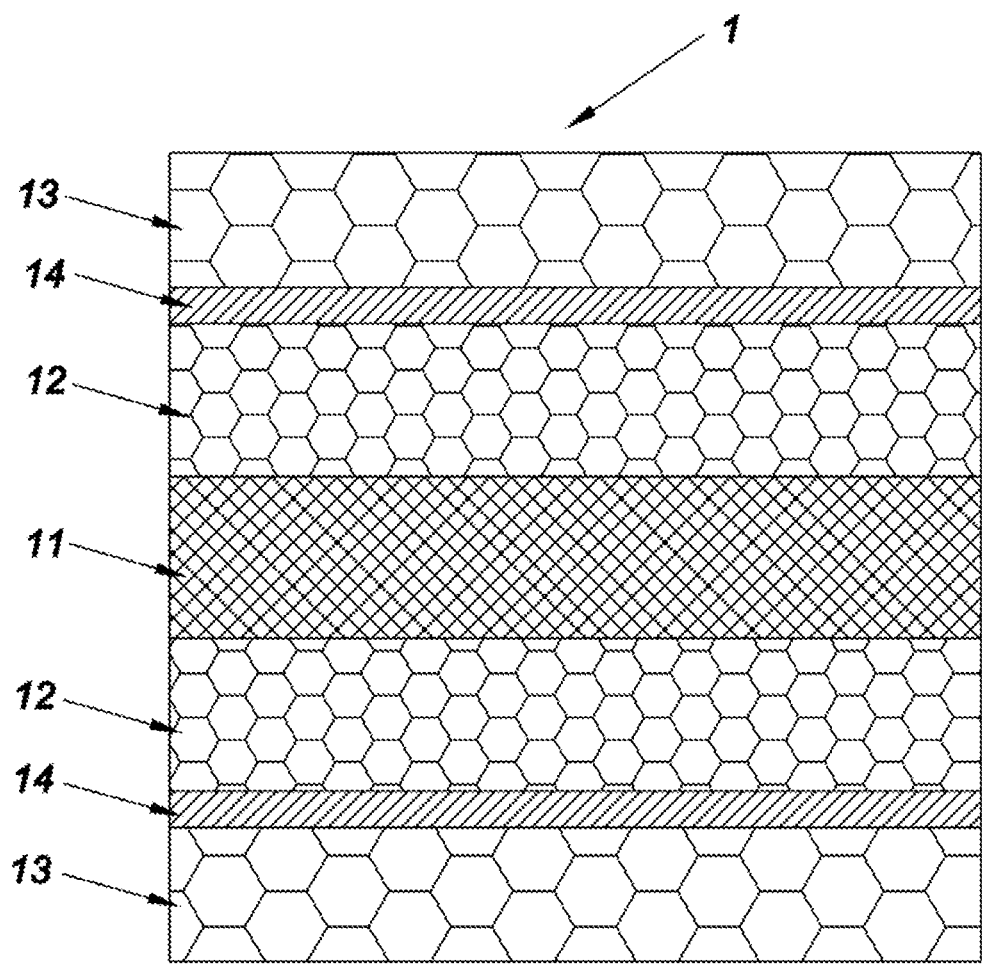
FIG. 2 is a section view taken along direction A-A of FIG. 1.

As shown in FIGS. 1 and 2, in this embodiment, an electromagnetic dielectric material 1 is a cylinder structure. The electromagnetic dielectric material includes an inner core 11, a first foam layer 12 and a second foam layer 13 sequentially arranged from inside to outside on a cross section of the cylinder structure. The inner core 11 is made of a polyethylene (PE) material.

As shown in FIGS. 1 and 2, the electromagnetic dielectric material further includes 4 metal wires 14. The 4 metal wires 14 are disposed in the longitudinal direction of the cylinder structure, are not in contact with each other and are evenly distributed on the periphery of the first foam layer 12.

In this embodiment, the diameter of the bottom of the cylinder structure of the electromagnetic dielectric material 1 is 5 mm, and the height of the cylinder structure is also 5 mm. Since the diameter of the bottom of the cylinder structure is the diameter of the second foam layer 13, the diameter of the second foam layer 13 is 5 mm. The diameter of the first foam layer 12 is 0.6 times the diameter of the second foam layer 13, that is, the diameter of the first foam layer 12 is 3 mm.

In this embodiment, the material of the first foam layer 12 and the second foam layer 13 is EPE pearl cotton, that is, polyethylene foaming cotton.

Embodiment Two

This embodiment is another illustrative example of an electromagnetic dielectric material structure of the present disclosure.

Figure 3:
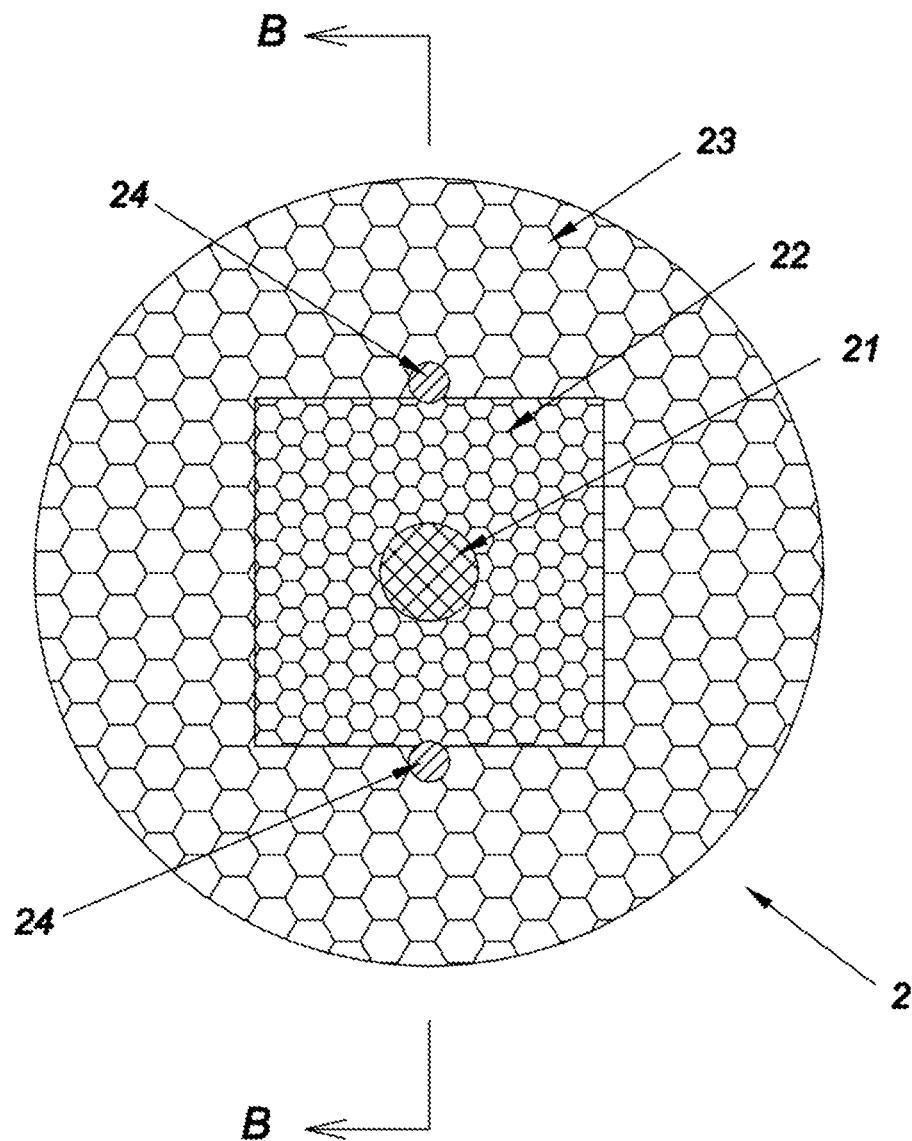
FIG. 3 is a front view illustrating the structure of an electromagnetic dielectric material according to embodiment two.
Figure 4:
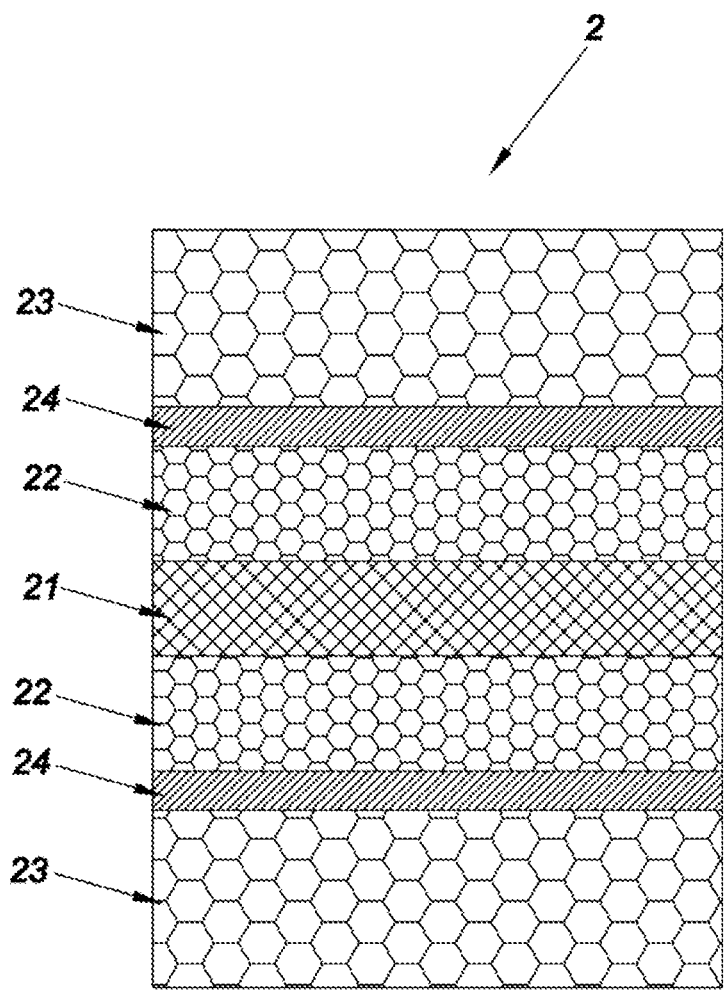
FIG. 4 is a section view taken along direction B-B of FIG. 3.

As shown in FIGS. 3 and 4, this embodiment is different from embodiment one in that: the diameter of the bottom of a cylinder structure of an electromagnetic dielectric material 2 is 8 mm, and the height of the cylinder structure is 6 mm; the contour shape of the cross section of a first foam layer 22 is a square; the diameter of the circumscribed circle of the square is 0.625 times the diameter of a second foam layer 23, that is, 5 mm; and there are only two metal wires 24, and the two metal wires 24 fit tightly against the symmetric edges of the square and are opposite to each other.

Embodiment Three

This embodiment is an illustrative example of a method for producing an electromagnetic dielectric material of the present disclosure.

(1) A PE wire core with a diameter of 0.5 mm is coiled into a wire coil. One end of the wire core is threaded into the extruder chamber of a first rod extruder and then out from the extruder outlet of the first rod extruder. The wire core is uncoiled during production. The first rod extruder is a foam material rod extruder, and the material used is an EPE pearl cotton raw material. The first rod extruder is started. When the first rod extruder is extruding a material, the wire core is pulled synchronously. The synchronization means that the pulling speed of the wire core is the same or approximately the same as the extrusion speed of the first rod extruder. Thus, the foamed material dads the wire core, and it is ensured that the wire core is in the center of the material so that a wire core rod is obtained. In this embodiment, the diameter of the wire core rod is 3 mm.

(2) The wire core rod is threaded into the extruder chamber of a second rod extruder and then out from the extruder outlet of the second rod extruder. The second rod extruder is a foam material rod extruder, and the material used is the EPE pearl cotton raw material. At the same time, 4 metal wires are also threaded into the extruder chamber of the second rod extruder and then out from the extruder outlet of the second rod extruder. The four metal wires are each coiled into a wire coil and are uncoiled during production. When the second rod extruder is extruding a material, the wire core rod and the metal wires are pulled synchronously. The shape of the extruder outlet is designed accordingly such that the 4 metal wires are not in contact with each other and are evenly distributed on the periphery of the wire core rod and such that the material extruded by the second rod extruder clads the wire core rod and each metal wire so that a double-layer rod is obtained. In this embodiment, the diameter of the double-layer rod is 5 mm.

(3) Subsequently, the double-layer rod is cut into a cylinder structure with a height of 5 mm by a fixed-length cutter so that the electromagnetic dielectric material of the structure described in embodiment one is obtained.

It is to be noted that the wire core rod obtained in step (1) may be cut into the same length in a fixed-length manner and then step (2) is started, or the wire core rod may be coiled integrally into a wire coil and then step (2) is started.

Similarly, the double-layer rod obtained in step (2) may be cut into the same length in a fixed-length manner and then step (3) is started, or the double-layer rod may be coiled integrally into a wire coil and then step (3) is started.

The embodiments set forth above are preferred embodiments of the present disclosure.

Any equivalent technical variations made under the working principles and ideas of the present disclosure are within the scope of the present disclosure.

What is claimed is:

1. An electromagnetic dielectric material, being a column structure, comprising:
   one inner core, one first foam layer and one second foam layer which are sequentially arranged from inside to outside on a cross section of the column structure, wherein the first foam layer and the second foam layer each is formed by a foam material being foamed;
   the electromagnetic dielectric material further comprising metal wires, wherein the metal wires are disposed in a longitudinal direction of the column structure, and are evenly distributed on a periphery of the first foam layer without being in contact with each other; and
   wherein a diameter of each metal wire is in a range from 0.01 mm to 0.5 mm.

2. The electromagnetic dielectric material according to claim 1, wherein the first foam layer and the second foam layer each is formed by expandable polyethylene (EPE) pearl cotton, an expandable polystyrene (EPS) material or an ethylene vinyl acetate (EVA) material.

3. The electromagnetic dielectric material according to claim 1, wherein the electromagnetic dielectric material comprises 2 to 8 metal wires.

4. The electromagnetic dielectric material according to claim 1, wherein a contour shape of a cross section of the first foam layer is a circle or a regular polygon.

5. The electromagnetic dielectric material according to claim 1, wherein a contour shape of a cross section of the second foam layer is a circle or a regular polygon.

6. The electromagnetic dielectric material according to claim 1, wherein in a case where a contour shape of a cross section of the first foam layer and a contour shape of a cross section of the second foam layer each is circular, a diameter of the second foam layer is in a range from 4 mm to 12 mm, and a diameter of the first foam layer is 0.3 to 0.7 of the diameter of the second foam layer.

7. A method for producing an electromagnetic dielectric material, comprising:
   (1) threading a wire core into an extruder chamber of a first rod extruder and threading the wire core out from an extruder outlet of the first rod extruder; and while the first rod extruder is extruding a material, pulling the wire core synchronously, to enable that the material to clad the wire core and to make the wire core be in a center of the material, so that a wire core rod is obtained;
   (2) threading the wire core rod into an extruder chamber of a second rod extruder and threading the wire core rod out from an extruder outlet of the second rod extruder, and at a same time, threading metal wires into the extruder chamber of the second rod extruder and threading out from the extruder outlet of the second rod extruder; and while the second rod extruder is extruding a material, pulling the wire core rod and the metal wires synchronously to enable the metal wires to be evenly distributed on a periphery of the wire core rod without being in contact with each other, and to enable the material extruded by the second rod extruder to clad both the wire core rod and each metal wire, so that a double-layer rod is obtained; and
   (3) cutting the double-layer rod to have a required length to obtain the electromagnetic dielectric material,
   wherein the first rod extruder and the second rod extruder are each a foam material rod extruder and a diameter of each metal wire is in a range from 0.01 mm to 0.5 mm.

8. The method for producing an electromagnetic dielectric material according to claim 7, wherein the material extruded by the first rod extruder and the second rod extruder is expandable polyethylene (EPE) pearl cotton, an expandable polystyrene (EPS) material or an ethylene vinyl acetate (EVA) material.

9. The method for producing an electromagnetic dielectric material according to claim 7, wherein a contour shape of a cross section of the wire core rod is a circle or a regular polygon, and a contour shape of a cross section of the double-layer rod is a circle or a regular polygon.

10. The electromagnetic dielectric material according to claim 4, wherein a contour shape of a cross section of the second foam layer is a circle or a regular polygon.

* * * * *